United States Patent [19]
Russell et al.

[11] Patent Number: 5,208,563
[45] Date of Patent: May 4, 1993

[54] RADIO FREQUENCY CIRCUIT

[75] Inventors: Mark E. Russell, Londonderry, N.H.; David C. Miller, Greenfield; Anthony M. Donisi, Tewksbury, both of Mass.

[73] Assignee: Raytheon Company, Lexington, Mass.

[21] Appl. No.: 810,615

[22] Filed: Dec. 19, 1991

[51] Int. Cl.$^5$ .............................................. H01P 5/22
[52] U.S. Cl. .................................. 333/109; 333/116; 333/120; 333/262; 342/149
[58] Field of Search ........ 333/103, 104, 109, 115–117, 333/120, 127, 128, 136, 262

[56] References Cited

U.S. PATENT DOCUMENTS

| | | | |
|---|---|---|---|
| 3,295,134 | 12/1966 | Lowe | 333/109 X |
| 3,551,707 | 12/1970 | Seitzer | 333/103 X |
| 3,988,705 | 10/1976 | Drapac | 333/109 |
| 4,485,360 | 11/1984 | Seward | 333/109 X |

Primary Examiner—Paul Gensler
Attorney, Agent, or Firm—Donald F. Mofford; Richard M. Sharkansky

[57] ABSTRACT

An RF circuit includes an RF power divider circuit having an input port and a plurality of output ports the RF power divider circuit providing in response to a signal fed to the input port an output signal at each output port each output signal having known amplitude and known phase. The RF circuit further includes means for selectively coupling at least a portion of a signal fed to an input port of the RF circuit to the input port of the RF power divider circuit and a like plurality of directional coupler circuits each of the coupler circuits having an input port and a coupled port with each input port coupled to a corresponding one of the plurality of output ports of the power divider circuit and each coupled port corresponding to an output port of the RF circuit.

7 Claims, 3 Drawing Sheets

RADIO FREQUENCY CIRCUIT

BACKGROUND OF THE INVENTION

This invention relates to radio frequency circuits and more particularly to radio frequency calibration circuits.

As is known in the art, there exists a trend toward operation of radar systems at higher frequency bands particularly the millimeter wave frequency band. For example a typical monopulse radar system includes an antenna, coupled to a monopulse arithmetic circuit (hereinafter monopulse circuit). The antenna feeds radio frequency (RF) signals to input ports of the monopulse circuit. The monopulse circuit provides at its output ports so-called monopulse output signals. The monopulse output signals typically include a sum signal, an elevation difference signal and an azimuth difference signal. The monopulse circuit provides the monopulse output signals having a particular amplitude and phase characteristic. Moreover, the amplitude and phase characteristics of each of the monopulse output signals have a particular amplitude and phase relationship with respect to each other. The monopulse circuit feeds such monopulse output signals to an RF receiver.

The RF receiver typically includes a signal path generally referred to as a receiver channel for each of the monopulse signals provided by the monopulse circuit.

Each receiver channel receives a corresponding monopulse output signal having an RF frequency, and downconverts said monopulse signal to an intermediate frequency (IF). The receiver channels typically include RF circuit components such as limiters, filters, amplifiers, mixers and the like which operate over a desired frequency band. Such circuit components are identically disposed to provide the receiver channels as like receiver channels. One problem with such RF receivers however is that due to variations in electrical characteristics of the circuit components, each of said like receiver channels may have different insertion loss and insertion phase characteristics.

Such insertion loss and insertion phase imbalances between the receiver channels is a source of error in a radar system since the RF receiver feeds the IF monopulse signals to a digital signal processor which provides direction finding information to the radar system by comparing the amplitude and phase of the sum signal to the amplitudes and phases of the elevation difference and azimuth difference signals. Thus to obtain accurate direction finding information the RF receiver should not change the relative amplitude and phase characteristics of the monopulse output signals fed thereto.

One solution to this problem in a conventional monopulse radar system operating in the microwave frequency range is to provide the RF receiver channels with RF circuit components having matched electrical characteristics. That is, bandpass filters, limiters, amplifiers, mixers and the like are provided as matched sets for each of the receiver channels. With matching of components, each receiver channel should provide substantially equal insertion loss and insertion phase characteristics to signals fed thereto.

There are several problems with this approach. For example, in those RF receivers having a plurality of like receiver channels it is relatively expensive to purchase RF circuit components having matched insertion loss and insertion phase characteristics. Moreover, impedance mismatches between components will also provide amplitude and phase variations in the receiver channels. Thus such matched sets of circuit components should be specified having very low reflection characteristics (i.e. voltage standing wave ratio - VSWR) at both input and output ports to thus minimize amplitude and phase variations resulting from impedance mismatching.

Furthermore, at millimeter wave frequencies it is difficult to provide RF circuit components having matched insertion loss and insertion phase characteristics. Thus the cost of procuring RF circuit components having matched insertion loss and insertion phase characteristics and low VSWR characteristics at millimeter wave frequencies may be prohibitively expensive.

Moreover the logistics of keeping the matched sets of RF circuit components together during the assembly of the RF receivers is undesirable. An additional logistic problem arises when one RF circuit component of an RF receiver channel fails. In this case to maintain the desired insertion loss and insertion phase relationship between the three receiver channels, the corresponding components in each of the remaining receiver channels should also be replaced.

A so-called line stretcher (e.g. a transmission line having an adjustable length) provided in each receiver channel may be used to adjust the insertion phase characteristic of each receiver channel. Thus any imbalance between the insertion phase characteristics of one receiver channel relative to the other receiver channels may be removed via the line stretcher.

However, the line stretcher phase matching technique is frequency dependent. Thus this technique provides the receiver channels having a matched phase characteristic over a narrow band of frequencies.

Modern radar systems have relatively broadband receive bandwidths. Thus the line stretcher phase matching approach is not suitable to provide the RF receiver channels having matched insertion phase characteristics over the desired operating frequency bandwidth of broadband radar systems. This is particularly true in those radar systems which operate in the millimeter wave frequency range. It would be desirable therefore to provide an approach which avoids the problem associated with both the matched components and line stretcher techniques.

SUMMARY OF THE INVENTION

In accordance with the present invention, a radio frequency (RF) circuit includes an RF power divider circuit having an input port and a plurality of output ports, the RF power divider circuit providing in response to a signal fed to the input port an output signal at each output port, each of such output signals having equal amplitude and equal phase. The RF circuit further includes means for selectively coupling at least a portion of signal fed to an input port of the RF circuit to the input port of the RF power divider circuit. The RF circuit further includes a like plurality of directional coupler circuits' each of the directional coupler circuits having an input port and a coupled port with each input port coupled to a corresponding one of the plurality of output ports of the power divider circuit and each coupled port corresponding to an output port of the RF circuit. With this particular arrangement a signal injection circuit is provided. The means for selectively coupling may be provided as a directional coupler having an input port corresponding to an input port of the RF circuit and having a coupled port coupled to an input port of a single pole single throw switch. The directional coupler is provided having a relatively low coupling value, thus the presence of the directional coupler has substantially no effect on a signal path coupled thereto. Similarly, the means for coupling the plurality of output ports of the signal injection circuit to a like plurality of receiver channels may be provided by directional couplers having a relatively low coupling value. Thus the presence of the directional couplers have substantially no effect on a signal path coupled thereto. The signal injection circuit finds use in systems where it is desirable to provide signals having known amplitude and phase characteristics to different signal paths. In a radar system for example, the signal injection circuit may couple at least a portion of a signal from a transmit signal path of the radar system to each channel of an RF receiver while leaving the transmit signal path and receiver channels substantially unaffected by its presence. Such a signal may be provided to substantially identical receiver channels of the RF receiver and used to measure the differences in insertion loss and insertion phase characteristics between each of the receiver channels. Such insertion loss and insertion phase imbalances between receiver channels may be stored as compensation values in a digital signal processor for example. The digital signal processor may use such compensation values to provide accurate direction finding information to other portions of the radar system.

BRIEF DESCRIPTION OF THE DRAWINGS

The foregoing features of this invention as well as the invention itself may be more fully understood from the following detailed description of the drawings in which

FIG. 1A is an alternate block diagram of a first portion of the signal injection circuit shown in FIG. 1;

DESCRIPTION OF THE PREFERRED EMBODIMENTS

Figure 1:
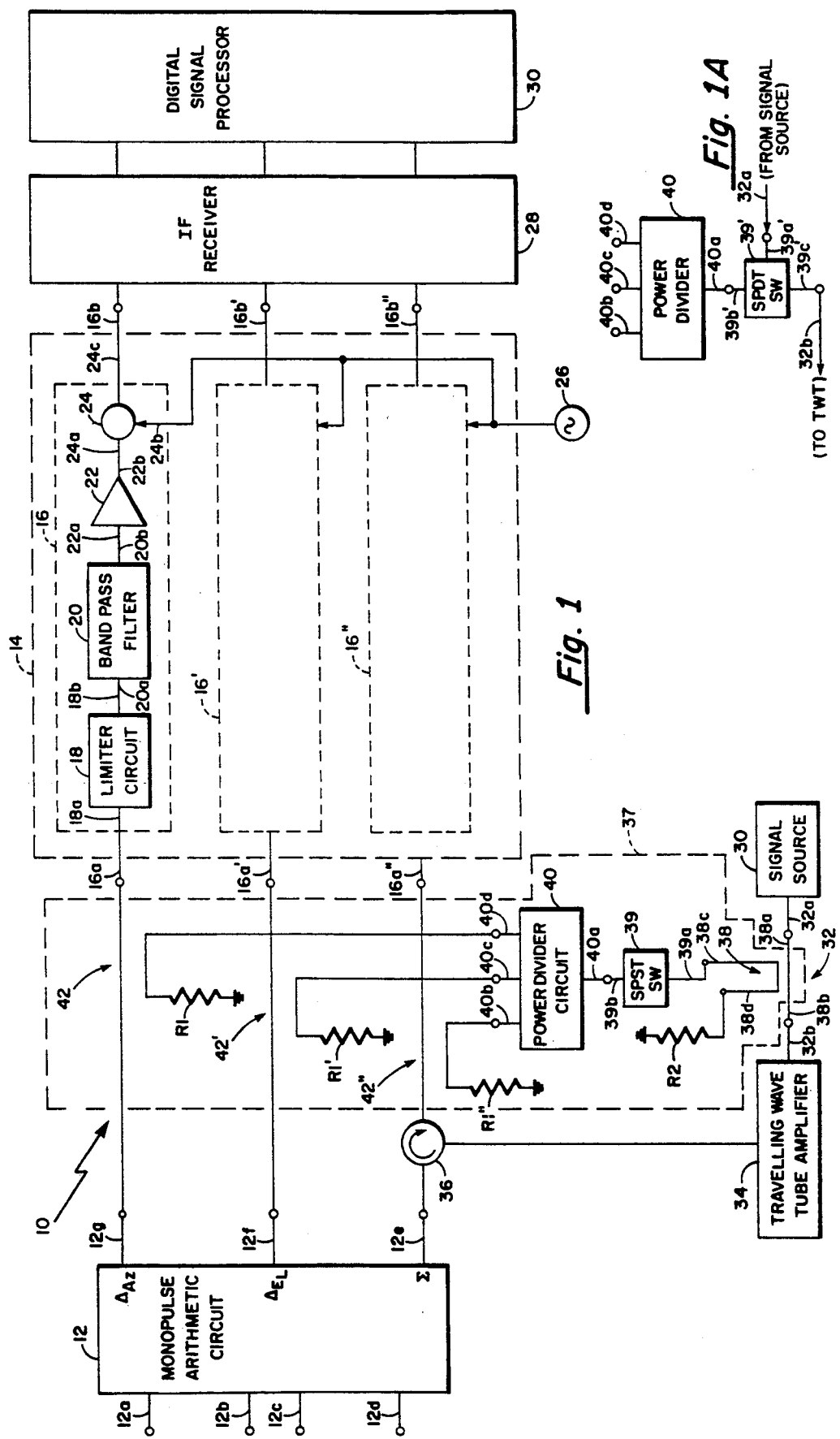
FIG. 1 is a block diagram of a radar system.

Referring now to FIG. 1, a monopulse radar system 10 is shown to include a monopulse arithmetic circuit 12 (hereinafter monopulse circuit) having input ports 12a, 12b, 12c and 12d and output ports 12e, 12f and 12g. The input ports 12a-12d are typically coupled to an antenna (not shown) as is generally known.

In response to signals fed to the input ports 12a-12d, the monopulse circuit 12 provides at the output ports 12e-12g, so-called monopulse output signals well known to those of skill in the art. Here, the monopulse output signals include a sum signal ($\Sigma$) provided at the output port 12e, an elevation difference signal ($\Delta_{el}$) provided at the output port 12f and an azimuth difference signal ($\Delta_{az}$) provided at the output port 12g. The monopulse output ports are coupled to an RF receiver 14 having three receiver channels 16, 16', 16" which will be further described below.

The radar system 10 further includes a signal source 30 coupled to a transmit signal path 32 having portions 32a, 32b. The transmit signal path 32 couples a transmit signal having a relatively low power level from the signal source 30 to a travelling wave tube amplifier (TWT) 34. The TWT 34 receives the low power transmit signal from the signal source 30 and provides a transmit signal having a relatively high power level to a duplexer circuit 36. The duplexer 36 couples the high power transmit signal from the TWT 34 to the sum port 12e of the monopulse circuit 12. The transmit signal propagates through the monopulse circuit 12 and is emitted from the radar system 10 through the antenna (not shown) as is generally known. The transmit signal reflects off of an object (e.g. a target) and portions of the transmit signal are intercepted by the antenna and fed to the monopulse circuit input ports 12a-12d.

The output ports 12e, 12f, 12g of the monopulse circuit 12 are coupled to the receiver channels at corresponding ones of the input ports 16a", 16a', 16a. Taking receiver channel 16 which is also representative of the receiver channels 16', 16", a limiter circuit 18 has an input port 18a coupled to an input port 16a of the receiver channel 16. An output port 18b of the limiter 18 is coupled to an input port 20a of a bandpass filter circuit 20. An output port 20b of the bandpass filter 20 is coupled to an input port 22a of an amplifier circuit 22. The amplifier circuit 22 receives signals fed thereto and provides such signals to a mixer circuit 24 at an RF input port 24a. A local oscillator (LO) signal source 26 provides LO signals to the mixer circuit 24 at an LO port 24b. The mixer circuit 24 provides intermediate frequency (IF) signals at an output port 24c. Such IF signals have a frequency corresponding to the difference in frequency between the LO and RF signals. The IF signal, here the $\Delta_{az}$ signal, is coupled from the output port 24c of the mixer 24 to an output port 16b of the receiver channel 16.

The IF receiver 28 receives the IF monopulse output signals $\Delta_{az}$, $\Delta_{el}$, $\Sigma$ from the RF receiver channel output ports 16b, 16b, and 16b" respectively and further down-converts such signals to a second IF frequency. The IF receiver 28 feeds such signals to a digital signal processor 30. The digital signal processor 30 compares the amplitude and phase of the signal on the sum ($\Sigma$) channel to the amplitudes and phases of the signals provided on the difference channels ($\Delta_{az}$, $\Delta_{el}$). By comparing the amplitudes and phases of the monopulse output signals, the digital signal processor 30 provides inter alia direction finding information used to track the target (not shown). Thus, to minimize errors in the direction finding information the insertion loss characteristic and insertion phase characteristic of each receiver channel 16, 16', 16" should be substantially known.

A signal injection circuit 37 includes a coupler circuit 38 having an input port 38a coupled to the transmit signal path 32a, an output port 38b coupled to the transmit signal path 32b, a coupled port 38c coupled to an input port 39a of a single pole single throw switch 39 and an isolated port 38d coupled to a termination resistor R2.

Here the coupler circuit 38 is provided having a coupling value of typically of about $-13$ dB. Although other coupling values may be used, the coupler circuit 38 should be provided having a relatively low coupling value. Thus the insertion loss characteristic of the transmit signal path 32 is substantially unaffected by the presence of the coupler circuit 38.

The signal injection circuit 37 further includes a power divider circuit 40 having an input port 40a coupled to the output port 39b of the single pole single throw switch 39. The power divider circuit 40 is provided having three output ports 40b, 40c and 40d. Each of the output ports 40b–40d is coupled to an input port of a corresponding one of the couplers 42", 42' and 42 of said coupler circuits having a coupling level typically of about −30 dB. The coupler circuits 42, 42', 42" receive signals fed thereto and couple such signals to a corresponding one of the receiver channel input ports 16a, 16a', 16a".

Referring momentarily to FIG. 1A, an alternate embodiment of a first portion of the signal injection circuit 37 is shown to include a single pole double throw switch 39' having a common port 39a' coupled to the transmit signal path 32a, a first branch port 39c coupled to the second portion of the transmit signal path 32b and a second branch port 39b' coupled to the input port 40a of the power divider circuit 40. Thus in this embodiment, the single pole double throw switch 39' may selectively couple signals from the signal source 30 to either the power divider circuit 40 or to the traveling wave tube amplifier 34.

Referring again to FIG. 1, the coupler circuit 38 couples a portion of the transmitted signal from the transmit signal path 32 to the input port 39a of the switch circuit 39. The switch circuit 39 and power divider circuit 40 will be described further in conjunction with FIG. 2. Suffice it here to say that when the radar system 10 is in either the transmit or receive mode, the switch circuit 39 should terminate RF signals fed to the input port 39a with a minimum reflection characteristic.

The radar system 10 may operate in a so-called calibration mode. In the calibration mode, the TWT 34 is placed in an off state and the signal source 30 provides a so-called calibration signal as a continuous wave (CW) signal or alternatively as a plurality of signal pulses to the transmit signal path 32a. It is preferable to provide the calibration signal as a plurality of signal pulses since the radar system 10 may use the time delay associated with such signal pulses to distinguish the calibration signal from other "leakage" signals in the radar system. For example, even with the TWT 34 in its off state a signal provided to the TWT 34 may leak from the TWT 34 and propagate through the duplexer 36 and subsequently to the RF receiver channel 16". Such a leakage signal interferes with the signal fed to the channel 16" via the coupler 42".

The signal injection circuit 37 couples a portion of the calibration signal from the signal source 30 and provides the calibration signals having substantially known relative amplitude and phase characteristics to the receiver channel input ports 16a, 16a' and 16a".

The receiver channels 16, 16' and 16" receive the calibration signals and provide corresponding output signals at the output ports 16b, 16b', 16b". Amplitude and phase differences between the signals measured at the output ports 16b, 16b' and 16b" correspond to differences in the insertion loss and insertion phase characteristics between the receiver channels 16, 16', 16" less the known differences in amplitude and phase of the calibration signals provided by the signal injection circuit 37. Thus compensation values for each of the receiver channels 16, 16', 16" may be computed and stored in the digital signal processor 30 for example to compensate for differences in the insertion loss and insertion phase characteristics of each of the receiver channels 16, 16', 16".

The insertion loss and insertion phase characteristics of each of the receiver channels 16—16" will in general be different. However, since the insertion loss and insertion phase characteristics of the switch 39 and power divider circuit 40 are known, the relative insertion loss and insertion phase between the receiver channels 16—16" may be determined since a common signal is coupled from the signal source 30 to the receiver channels 16—16" via the signal injection circuit 37. These differences represent the compensation values used by the digital signal processor 30 for corrected direction finding.

Figure 2:
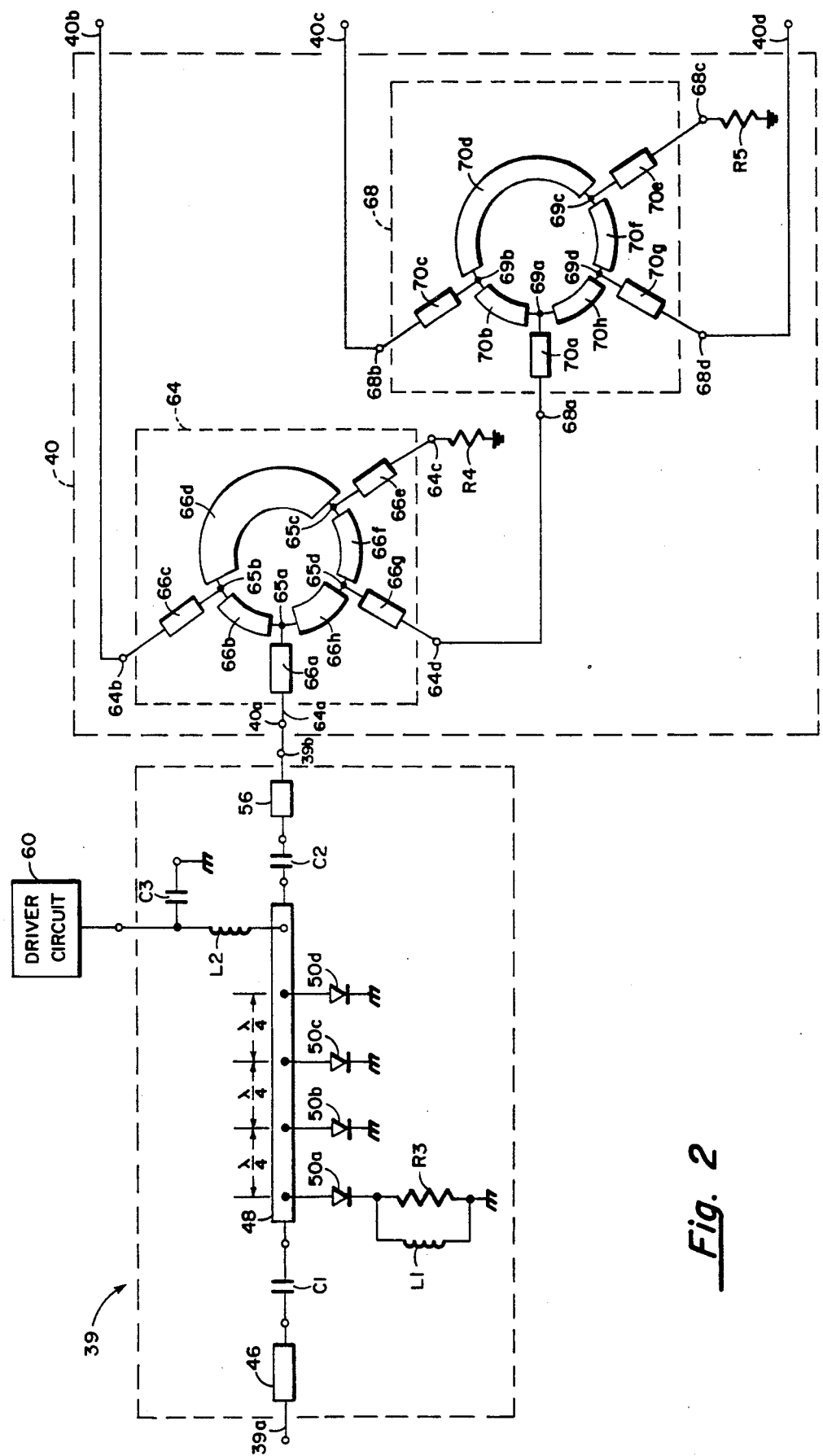
FIG. 2 is a schematic diagram of a switchable power divider circuit of the type used in the calibration injection circuit shown in FIG. 1.

Referring now to FIG. 2, the switch circuit 39 of FIG. 1 is here shown as a single pole, single throw (hereinafter SPST) non-reflective switch 39 having an input propagation network 46. The input propagation network 46 has a first end coupled to the input port 39a of the switch circuit 39 and a second end coupled to a first electrode of a DC blocking capacitor C1.

A second electrode of the capacitor C1 is coupled to a first end of a second RF propagation network 48. A plurality of diodes 50a, 50b, 50c and 50d are coupled along the RF propagation network 48. Said diodes 50a–50d are spaced along the RF propagation network 48 separated by a distance of one-quarter of a wavelength at a desired frequency of operation.

The first diode 50a has an anode coupled to the RF propagation network 48 and a cathode coupled to a first electrode of a resistor R3 having a resistance typically of about 47 ohms ($\Omega$). A second electrode of the resistor R3 is coupled to ground. A first electrode of an inductor L1 having an inductance typically of about 5 nanohenries (nH) is coupled to the first electrode of the resistor R3. A second electrode of the inductor L1 is coupled to the second electrode of the resistor R3.

The diodes 50b–50d each have an anode coupled to the RF propagation network 48 and a cathode coupled to a first reference potential. Here said reference potential corresponds to ground.

A driver circuit 60 is coupled to the RF propagation network 48 via series inductor L2 having an inductance typically of about 15 nH. A so-called RF by-pass capacitor C3 having a capacitance typically of about 100 picofarads (pf) is coupled between the driver circuit 60 and ground to thus decouple RF signals from the driver circuit 60 as is generally known.

In the transmit and receive modes, the driver circuit 60 provides a control signal to forward bias the diodes 50a–50d. The forward bias control signal places the diodes 50a–50d in their conductive states. Thus in this instance each of the diodes 50b, 50c, 50d provides a low impedance signal path to ground.

The diode 50a however provides a low impedance signal path between the transmission line 48 and the resistor R3. Signals fed to the input terminal 39a are subsequently coupled to the resistor R3 and terminated. Thus when the radar system 10 operates in the transmit and receive modes, signals fed to the input port 39a via the coupler 38 (FIG. 1) are not reflected back toward the coupler 38 (FIG. 1). Rather the switch circuit 39 terminates such signals in the resistor R3.

Furthermore, any reflected signals provided by the imperfect match of diode 50a and the resistor R3 are fed to the coupler 38 (FIG. 1) and terminate in the resistor R2 (FIG. 1). Therefore in the transmit and receive modes when the control signals provide the diodes 50a–50d in their forward biased state the switch circuit 39 terminates signals fed to the input port 39a with a minimum reflection characteristic.

Conversely in the calibration mode, the driver circuit 60 provides a control signal to reverse bias the diodes 50a–50d. In this instance the diodes 50a–50d provide a high impedance signal path between the RF propagation network 48 and ground. Thus, signals fed to the input port 39a of the switch circuit 39 propagate along the RF propagation network 48 with a relatively small amount of attenuation.

A second end of the RF propagation network 48 is coupled to a first electrode of a second DC blocking capacitor C2. A second electrode of the capacitor C2 is coupled to a first end of an output RF propagation network 56. A second end of the RF propagation network 56 is coupled to a three-way power divider circuit 40 at an input port 40a. Thus a signal path (not numbered) comprised of RF propagation networks 48 and 56 connects the input port 39a of the switch circuit 39 and the input port 40a of the three way power divider circuit 40. Therefore by switching the diodes 50a–50d between their non-conducting and conducting states, the switch circuit respectively connects and disconnects the signal path (not nunbered) between the switch circuit input port 39a and the three way power divider circuit input port 40a.

The three-way power divider circuit 40 includes a first so-called rat-race power divider circuit 64 having an input port 64a coupled to the input port 40a of the power divider circuit 40. A first RF propagation network 66a having a first impedance characteristic has a first end coupled to the input port 64a and a second end coupled to a node 65a. A second RF propagation network 66b having a second impedance characteristic and an electrical pathlength of 90 electrical degrees has a first end coupled to the node 65a and a second end coupled to a second node 65b. A third RF propagation network 66c having the first impedance characteristic has a first end coupled to the node 65b and a second end coupled to an output port 64b. The output port 64b is coupled to the output port 40b of the power divider circuit 40.

A fourth RF propagation network 66d having a third impedance characteristic and an electrical pathlength corresponding to 270 electrical degrees has a first end coupled to the node 65b and a second end coupled to a node 65c. A fifth RF propagation network 66e having the first impedance characteristic has a first end coupled to the node 65c and a second end coupled to an output port 64c. A resistor R4 has a first electrode coupled to the port 64c and a second electrode coupled to ground.

A sixth RF propagation 66f having the second impedance characteristic and an electrical pathlength corresponding to 90 electrical degrees has a first end coupled to the no e 65c and a second end coupled to a node 65d. A seventh RF propagation network 66g having the first impedance characteristic has a first end coupled to the node 65d and a second end coupled to an output port 64d. The impedance characteristics of the RF propagation networks 66a–66h are selected to provide predetermined power division between the ports 64b and 64d as will be further discussed in conjunction with FIG. 3.

An eighth RF propagation network 66h having the third impedance characteristic and a pathlength corresponding to 90 electric degrees has a first end coupled to the node 65d and a second end coupled to the node 65a.

In operation a signal fed to the input port 40a splits into two signals. A first signal travels along the RF propagation 66b in a clockwise direction and a second travels along the RF propagation network 66h in a counterclockwise direction.

The electrical pathlengths of the RF propagation networks 66b, 66d, 66f, 66h are selected such that the two signals arrive in phase at the ports 64b and 64d. Conversely, the two signals arrive 180 degrees out of phase at the node 65c and cancel each other out. In the ideal case, no signal propagates to the port 64c. Thus the port 64c is referred to as an isolated port.

In practical circuits however signals are provided to the isolated port 64c. The isolated port 64c is coupled to ground via the resistor R4. The resistor R4 is selected having a resistance which provides a matched termination to the isolated port 64c. Thus signals provided to the isolated port 64b are terminated in the resistor R4 with a minimum reflection characteristic.

The output port 64d is coupled to an input port 68a of a second rat-race power divider circuit 68. The second ratrace power divider circuit 68 has a first RF propagation network 70a having a first impedance characteristic and having a first end coupled to the input port 68a and a second end coupled to a node 69a. A second RF propagation network 70b having a second impedance characteristic and an electrical pathlength corresponding to 90 electrical degrees has a first end coupled to the node 69a and a second end coupled to a second node 69b. A third RF propagation network 70c having the first impedance characteristic has a first end coupled to the node 69b and a second end coupled to an output port 68b. The output port 68b is coupled to the output port 40c of the switch power divider circuit 40.

A fourth RF propagation network 70d having the second impedance characteristic and an electrical pathlength corresponding to 270 electrical degrees has a first end coupled to the node 69b and a second end coupled to a node 69c. A fifth RF propagation network 70e having the first impedance characteristic has a first end coupled to the node 69c and a second end coupled to an output port 68c. A resistor R5 has a first electrode coupled to the port 68c and a second electrode coupled to ground.

A sixth RF propagation 70f having the second impedance characteristic and an electrical pathlength corresponding to 90 electrical degrees has a first end coupled to the node 69c and a second end coupled to a node 69d. A seventh RF propagation network 70g having the first impedance characteristic has a first end coupled to the node 69d and a second end coupled to an output port 68d. The output port 68d is coupled to the output port 40d of the power divider circuit 40.

An eighth RF propagation network 70h having the second impedance characteristic and a pathlength corresponding to 90 electric degrees has a first end coupled to the node 69d and a second end coupled to the node 69a.

The second rat-race power divider circuit 68 divides signals fed to the input port 68a in the same manner as the rat-race power divider circuit 64 previously described. Here the resistor R5 provides a matched termination to the isolated port 68c of the rat-race power divider circuit 68. Thus signals provided to the isolated port 68c are terminated with a minimum reflection characteristic.

The power divider circuit 40 receives an input signal at the input port 40a and provides output signals at the output ports 40b, 40c, 40d. The line lengths of the RF propagation networks 66c, 70c and 70g are selected to provide a known insertion phase characteristics from the input port 40a to each of the output ports 40b, 40c, 40d. The insertion phase characteristic between the input port 40a and the output ports 40b–40d need not be equal, however the relative insertion phase characteristics between the input port 40a and each of the aforementioned output ports 40b–40d at a particular frequency should be known. Thus a signal fed to the input port 40a is divided and provided at the output ports, 40b, 40c, and 40d having known relative insertion phase characteristics.

Figure 3:
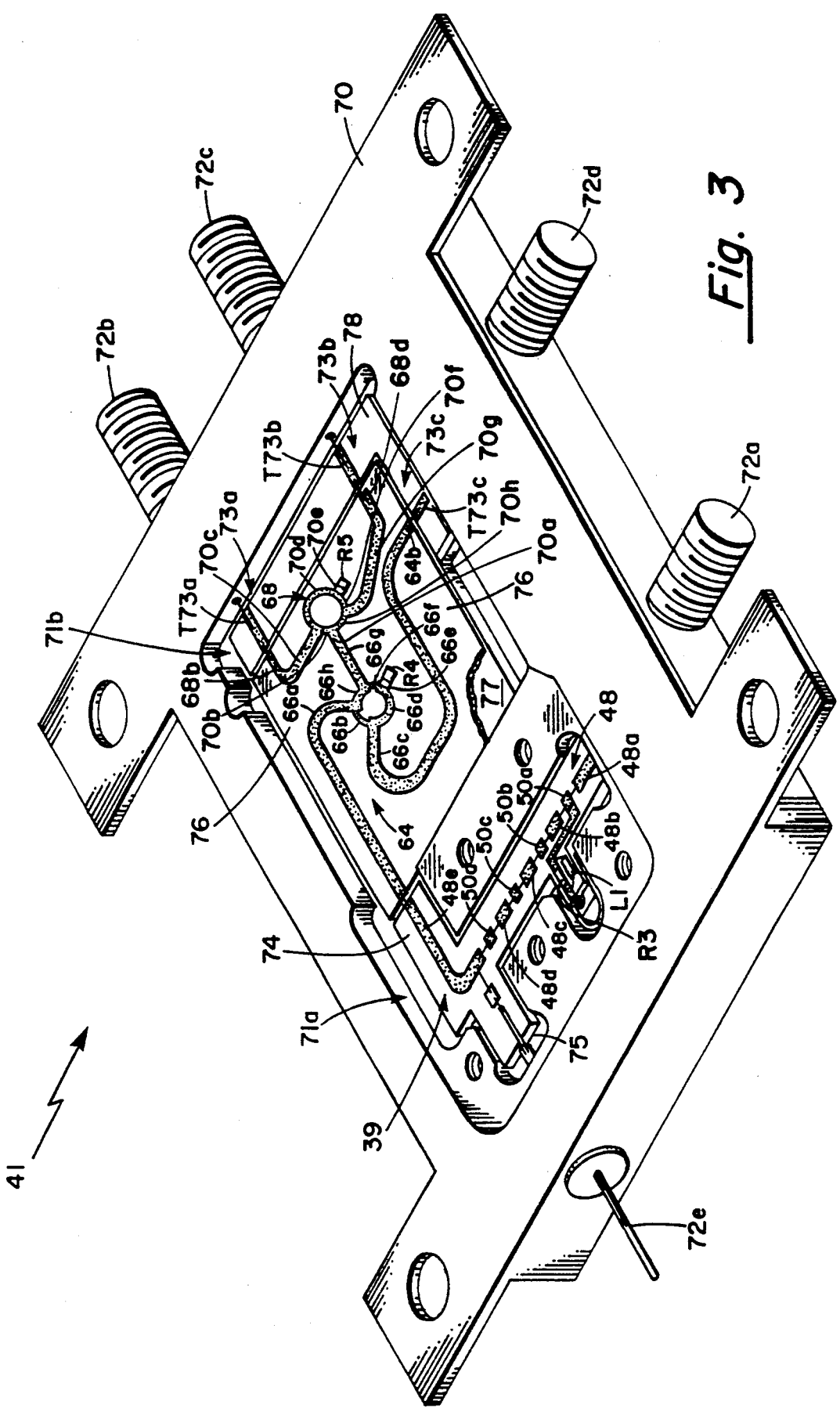
FIG. 3 is a plan view of a preferred embodiment of a switchable power divider circuit of the type shown in FIG. 2.

Referring now to FIG. 3 where like elements of the switch 39 and power divider circuit 40 of FIG. 2 are referenced with same designations, a switchable power divider circuit 41 is shown to include a base 70 comprised of a machine metal such as brass or aluminum for example and preferably having a coating (not numbered) of a highly conductive metal such as gold disposed thereon. The base 70 further has disposed thereon conventional coaxial connectors 72l, 72b, 72c, and 72d and a DC bias pin 72e. The base 70 has disposed therein a pair of recesses 71a, 71b. A first substrate 74 here provided as RT Duroid 5880 a registered trademark of the Rogers Corporation having a thickness typically of about 0.007 inches and a relative dielectric constant typically of about 2.2 is disposed in the first recess 71a. The substrate 74 is provided having a ground plane conductor 75 disposed on a first surface thereof.

The switch circuit 39 is disposed over a second surface of the substrate 74. In particular a plurality of strip conductors are disposed over a second surface of the substrate to provide in combination with the substrate 78 and the ground plane a plurality of microstrip transmission lines Such lines are thus arranged to provide the RF propagation network 48. In particular, it should be noted the RF propagation network 48 is here provided as a plurality of microstrip transmission lines 48a, 48b, 48c and 48d.

The diode 50a is here provided as a beam lead the type manufactured by Alpha Corporation, Woburn, MA, having part number DSG-647-4E-169-001. Similarly, the diodes 50b–50d are here provided as PIN diodes which may be of the type manufactured by Alpha Corporation as part number CB 900 2-454. The diodes 50a–50d may be coupled to the RF propagation network 48 using any technique well known to those of skill in the art.

A second substrate 76, here provided as alumina having a thickness typically of about 0.015 inches and a relative dielectric constant typically of about 9.9, is disposed in the second recess 71b. The substrate 76 has a ground plane conductor 77 disposed over a first surface thereof A plurality of strip conductors are disposed over a second surface of the substrate 76 to provide in combination with the substrate 76 and the ground plane 77 a plurality of microstrip transmission lines 66a–66h and 70a–70h. Such lines are thus arranged to provide the rat-race power divider circuits 64 and 68. The microstrip transmission lines 66a–66h are provided having the appropriate impedance characteristics to provide the desired power division in the rat-race power divider circuit 64. It should be noted that the nodes 65a–65d (FIG. 2) and likewise nodes 69a–69d (FIG. 2) here correspond to the junctions of microstrip transmission lines. For example, the node 65a is here provided by the junction of the microstrip transmission lines 66a, 66b and 66h.

Here the microstrip transmission lines 66a, 66c, 66e, 66g are each provided having an impedance characteristic corresponding to 50 ohms. The microstrip transmission lines 66b, 66f are provided having impedance characteristics corresponding to 93 ohms. The microstrip transmission lines 66a, 66h are provided having impedance characteristics corresponding to 59 ohms.

The microstrip transmission lines 66b, 66f and 66d, 66h are here provided having different impedance characteristics. Thus, a signal fed to the input port 64a divides unequally between the output ports 64b, 64d.

Here two-thirds of the power corresponding to −1.8 dB is provided to the port 64d and one-third of the power corresponding to −4.8 dB is provided to the output port 64b and subsequently coupled to the output port 40b. The signal fed to the input port may be divided in other ratios corresponding to the particular impedance characteristics provided to the microstrip transmission lines 66b, 66f, 66d and 66h.

The microstrip transmission lines 70a, 70c, 70e, 70g (FIG. 2) are each provided having an impedance characteristic corresponding to 50 ohms. The microstrip transmission lines 70b, 70d, 70f, 70h (FIG. 2) are provided having impedance characteristics corresponding to 70.7 ohms.

Since the microstrip transmission lines 70b, 70d, 70f, 70h are provided having equal impedance characteristics, the second rat-race power divider 68 here provides equal power division to signals fed to the input port 68a. Thus, a signal fed to the input port 68a divides equally between the output ports 68b, 68d of the power divider 68. Such signals are subsequently coupled to the corresponding output ports 40c, 40d of the power divider circuit 40.

It should be noted that microstrip transmission lines 66a–66h and 70a–70h (FIG. 2) are here provided having smooth bends. This is particularly important in those circuits operating in the millimeter wave frequency range since sharp bends provide impedance discontinuities to RF signals fed thereto. Impedance discontinuities tend to cause surface waves, phase dispersion of the RF signal and undesirable radiation of electromagnetic signals.

The output ports 64b, 68b and 68d of the power divider circuit 64 are each coupled to microstrip to coaxial transitions 73c, 73a, and 73b, respectively. The microstrip to coaxial transitions 73a–73c are here provided as strip conductors T73a, T73b, and T73c disposed on a first surface of a third substrate 78. A ground plane conductor (not shown) is disposed over a second surface of the substrate 78. The strip conductors T73a–T73c in combination with the substrate 78 and the ground plane 79 provide the microstrip to coaxial transitions 73a–73c as microstrip transmission lines.

Taking transition 73a as representative, the output port 40c is connected, via a bond ribbon having a width typically of about 0.015 inches for example, to a first end of the strip conductor T73a. A center conductor (not numbered) of the coaxial connector 72b is connected to a second end of the strip conductor T73a via well known soldering techniques. However, such connections may be made using any technique well known to those of skill in the art.

The third substrate 78 may be provided for example as RT Duroid 5880 having a thickness typically of about 0.007 inches and relative dielectric constant typically of about 2.2. The substrates 76, 78 each have different coefficients of thermal expansion. The substrate 78 should be provided as a so-called soft substrate to thus minimize the mechanical stresses which occur in the connections between the output ports 40b, 40c and 40d, the corresponding strip conductors T73a, T73b, T73c and the center conductors of the corresponding coaxial connectors 72b, 72c and 72d due to expansion and contraction of the substrates 76 and 78 which occurs during thermal cycling of the substrates 76 and 78.

Having described the preferred embodiments of the invention, it will now become apparent to one of skill in the art that other embodiments incorporating their concepts may be used. It is felt, therefore, that these embodiments should not be limited to the disclosed embodiments, but rather should be limited only by the spirit and scope of the appended claims.

What is claimed is:

1. An RF circuit comprising:
an RF power divider circuit having an input port and a plurality of output ports, said RF power divider circuit providing, in response to a signal fed to said input port, an output signal at each output port, each output signal having known amplitude and known phase;
means for selectively coupling at least a portion of a signal fed to an input port of said RF circuit to the input port of said RF power divider circuit;
wherein said means for selectively coupling comprises:
a first RF coupler having an input port coupled to the input port of the RF circuit and a coupled port; and
an RF switch having an input port coupled to the coupled port of the first RF coupler and an output port coupled to the input port of the RF power divider circuit; and
a plurality of directional coupler circuits, each of said directional coupler circuits having an input port and a coupled port with each input port coupled to a corresponding one of the plurality of output ports of the RF power divider circuit and each coupled port providing an output port of the RF circuit.

2. An RF circuit comprising:
an RF power divider circuit having an input port and a plurality of output ports, said RF power divider circuit providing, in response to a signal fed to said input port, an output signal at each output port, each output signal having known amplitude and known phase;
means for selectively coupling at least a portion of a signal fed to an input port of said RF circuit to the input port of said RF power divider circuit;
wherein said means for selectively coupling comprises:
a single pole dole throw switch having a common port coupled to an input of the RF circuit, a first branch port coupled to the input port of the power divider circuit and a second branch port coupled to an output port of the RF circuit; and
a plurality of directional coupler circuits, each of said coupler circuits having an input port and a coupled port with each input port coupled to a corresponding one of the plurality of output ports of the power divider circuit and each coupled port providing an output port of the RF circuit.

3. An RF circuit comprising:
a switchable power divider circuit having an input port and a plurality of output ports comprising;
a power divider circuit having an input port and a plurality of output ports corresponding to said plurality of output ports of the switchable power divider circuit;
a first RF propagation network having a first end coupled to an input port of the RF circuit and a second end coupled to the input port of the power divider circuit;
a first diode having an anode coupled to said RF propagation network and a cathode;
a first resistor having a first electrode coupled to said cathode of said first diode and a second electrode coupled to ground;
a plurality of diodes with each diode having an anode coupled to said first RF propagation network and a cathode coupled to a first reference potential and each diode of said plurality of diodes being spaced along said first RF propagation network by one-quarter of a wavelength at a predetermined frequency of operation;
first means for coupling the input port of said switchable power divider circuit to a transmit signal path; and
second means for coupling each one of the plurality of the output ports of said switchable power divider circuit to a corresponding one of a like plurality of receiver channels.

4. The RF circuit of claim 3 wherein said switchable power divider circuit and said power divider circuit each have three output ports.

5. The RF circuit of claim 4 wherein the second means for coupling comprises:
a like plurality of directional coupler circuits each of said directional coupler circuits comprising:
an input port coupled to a corresponding one of the plurality of output ports of said switchable power divider circuit; and
a coupled port coupled to a corresponding one of said like plurality of receiver channels.

6. The RF circuit of claim 5 wherein said power divider circuit comprises:
a first rat-race power divider circuit having an input port coupled to the input port of the power divider circuit, a first port coupled to a first output port of the switchable power divider circuit and a second port; and
a second rat-race power divider circuit having an input port coupled to the second port of the first rat-race power divider circuit, a first port coupled to a second output port of the switchable power divider circuit and a second port coupled to a third output port of the switchable power divider circuit.

7. An RF circuit comprising:
means, having an input port and an output port, for selectively coupling a portion of a signal from the input port to the output port, said selectively coupling means comprising:
a section of transmission line having a first end coupled to the input port and a second end;
a resistor having a first electrode and a second electrode, the second electrode coupled to ground;
a first diode coupled between the first electrode of the resistor and the section of transmission line; and
a plurality of diodes, each diode coupled between ground and the section of transmission line, each diode of said plurality of diodes having a coupling point with each coupling point spaced along said section of transmission line by one-quarter of a wavelength of a frequency of a predetermined signal; and means, coupled to the output of said selectively coupling means, for dividing a signal fed thereto into a plurality of signals, said dividing means comprising:

a first rat-race power divider circuit having an input port coupled to the output port of said selectively coupling means, a first output port and a second output port, the first output port to provide a first one of the plurality of signals; and a second rat-race power divider circuit having an input port coupled to the second output port of the first rat-race power divider circuit, a first output port to provide a second one of the plurality of signals and a second output port to provide a third one of the plurality of signals.

* * * * *